(12) United States Patent
Kojima et al.

(10) Patent No.: US 6,934,094 B2
(45) Date of Patent: Aug. 23, 2005

(54) IMAGING LENS DEVICE

(75) Inventors: Kaori Kojima, Kobe (JP); Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 48 days.

(21) Appl. No.: 09/878,475

(22) Filed: Jun. 11, 2001

(65) Prior Publication Data

US 2002/0018303 A1 Feb. 14, 2002

(30) Foreign Application Priority Data

Jun. 12, 2000 (JP) .......................................... 2000-174761
Dec. 4, 2000 (JP) .......................................... 2000-368340

(51) Int. Cl.⁷ .......................... G02B 3/02; G02B 15/14; G02B 9/04
(52) U.S. Cl. ........................ 359/717; 359/691; 359/692; 359/793; 359/794
(58) Field of Search ................. 359/717, 686, 359/692, 716, 711–715, 691, 793, 794, 796, 718

(56) References Cited

U.S. PATENT DOCUMENTS

| | | | | |
|---|---|---|---|---|
| 5,475,537 A | * | 12/1995 | Kobayashi et al. ......... 359/794 |
| 5,917,661 A | * | 6/1999 | Tochigig ..................... 359/717 |
| 5,940,360 A | * | 8/1999 | Choi ....................... 369/112.04 |
| 6,144,493 A | * | 11/2000 | Okuyama et al. ........... 359/566 |
| 6,181,477 B1 | | 1/2001 | Okajima ..................... 359/642 |
| 6,185,050 B1 | * | 2/2001 | Ota et al. ................... 359/691 |
| 6,236,512 B1 | * | 5/2001 | Nakai ......................... 359/641 |
| 6,278,554 B1 | * | 8/2001 | Aratani et al. .............. 359/631 |
| 6,292,306 B1 | * | 9/2001 | Betensky .................... 359/663 |
| 6,411,443 B1 | * | 6/2002 | Kato et al. ................. 359/686 |
| 6,519,098 B2 | * | 2/2003 | Nagaoka ..................... 359/793 |
| 2003/0011690 A1 | * | 1/2003 | Uryu ....................... 348/231.7 |

FOREIGN PATENT DOCUMENTS

| JP | 06-088939 A | 3/1994 |
|---|---|---|
| JP | 07-333494 A | 12/1995 |
| JP | H8-334684 A | 12/1996 |
| JP | 10-319315 A | 12/1998 |
| JP | 2000-35533 A | 2/2000 |

* cited by examiner

*Primary Examiner*—Timothy Thompson
(74) *Attorney, Agent, or Firm*—Sidley Austin Brown & Wood LLP

(57) ABSTRACT

An imaging lens device has an imaging lens system that forms an optical image and an image sensing device that converts the optical image formed by the imaging lens system into an electronic signal. The imaging lens system includes two lens elements each made of a homogeneous material and having a positive optical power, and fulfills the following condition: 1.25<L/f<2.00, where L is the distance from the most object side lens surface to the image plane, and f is the overall focal length of the lens system.

16 Claims, 4 Drawing Sheets

FNO=2.88

Y'=1.3

Y'=1.3

FNO=2.88
−0.5  0.5
SPHERICAL ABERRATION
SINE CONDITION

Y'=1.3
−0.5  0.5
ASTIGMATISM

Y'=1.3
−10.0  10.0
DISTORTION %

FNO=2.88
−0.5  0.5
SPHERICAL ABERRATION
SINE CONDITION

Y'=1.3
−0.5  0.5
ASTIGMATISM

Y'=1.3
−10.0  10.0
DISTORTION %

FNO=2.88

—— d
—— g
---- SC

-0.5    0.5
SPHERICAL ABERRATION
SINE CONDITION

Y'=1.0

---- DM
—— DS

-0.5    0.5
ASTIGMATISM

Y'=1.0

-10.0    10.0
DISTORTION %

FNO=2.88

—— d
—·— g
---- SC

-0.5  0.5
SPHERICAL ABERRATION
SINE CONDITION

Y'=1.0

---- DM
—— DS

-0.5  0.5
ASTIGMATISM

Y'=1.0

-10.0  10.0
DISTORTION %

IMAGING LENS DEVICE

This application is based on Japanese Patent Applications Nos. 2000-174761 and 2000-368340 filed respectively on Jun. 12, 2000 and Dec. 4, 2000, the contents of which are hereby incorporated by reference.

BACKGROUND OF THE INVENTION

Field of the Invention

The present invention relates to an imaging lens device, and more particularly, to an imaging lens device that optically captures an image of a subject by an imaging lens system and outputs the captured image as an electronic signal by an image sensing device, said imaging lens device being a principal component of a camera such as a digital camera, a video camera, or a camera incorporated in or externally attached to an apparatus such as a digital video unit, a personal computer, a mobile computer, a portable telephone, or a personal digital assistant (PDA).

Description of the Prior Art

Solid-state image sensing devices such as charge coupled devices (CCDs) disposed on image forming surfaces of various kinds of video cameras and digital cameras have been reduced in size year by year with advances in technology, and this requires imaging lens systems to be also reduced in size. As fixed-focal-length imaging lens systems compatible with small-format solid state image sensing devices, the following are known: ones comprising three lens elements (Japanese Laid-open Patent Application No. H10-319315, etc.); ones comprising two lens elements (Japanese Laid-open Patent Application No. H7-333494, etc.); and ones comprising one lens element (Japanese Laid-open Patent Application No. H6-88939, etc.).

In the three-element imaging lens system described in Japanese Laid-open Patent Application No. H10-319315, the cost is high since the number of lens elements is large, and the overall size of the lens system is large. In the two-element imaging lens system described in Japanese Laid-open Patent Application No. H7-333494, since the lens system comprises two plastic lens elements, variation in back focal length due to increase in temperature is too large, so that performance cannot be maintained. In the one-element imaging lens system described in Japanese Laid-open Patent Application No. H6-88939, since image plane quality and distortion are poor, high image quality cannot be maintained. Thus, these conventional examples are not optimum because they do not achieve size reduction and performance maintenance in good balance.

SUMMARY OF THE INVENTION

An object of the present invention is to provide an imaging lens device having an imaging lens system that is excellent in the balance between high performance and compactness.

To achieve the above-mentioned object, according to one aspect of the present invention, an imaging lens device is provided with: an imaging lens system that forms an optical image; and an image sensing device that converts the optical image formed by the imaging lens system into an electronic signal. The imaging lens system comprises two lens elements each made of a homogeneous material and each having a positive optical power, and fulfills the following condition (1):

$$1.25 < L/f < 2.00 \tag{1}$$

where

L represents the distance from the most object side lens surface to the image plane, and f represents the overall focal length of the lens system.

According to another aspect of the present invention, an imaging lens device is provided with: an imaging lens that forms an optical image; and an image sensing device that converts the optical image formed by the imaging lens system into an electronic signal. The imaging lens system comprises from the object side: a first lens element being a positive meniscus lens element convex to the image side, and a second lens element being a bi-convex positive lens element.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 11:
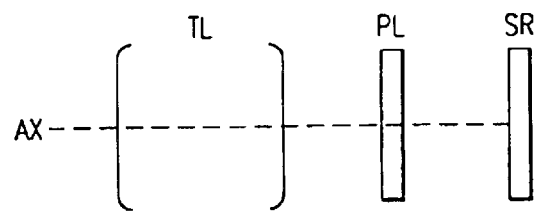
FIG. 11 is a schematic view briefly showing the optical structure of an imaging lens device according to the present invention.

Hereinafter, an imaging lens device embodying the present invention will be described with reference to the drawings. An imaging lens device that optically captures an image of a subject and outputs the captured image as an electronic signal is a principal component of a camera used for taking a still image or a moving image of a subject (for example, a digital camera, a video camera, or a camera incorporated in or externally attached to an apparatus such as a digital video unit, a personal computer, a mobile computer, a portable telephone, or a PDA). The imaging lens device comprises from the object (subject) side: for example as shown in FIG. 11, an imaging lens system, TL, that forms an optical image of a subject; a plane-parallel plate, PL, corresponding to an element such as an optical low-pass filter; and an image sensing device, SR, that converts the optical image formed by the imaging lens system, TL, into an electronic signal. In FIG. 11, AX represents the optical axis.

As the image sensing device SR, a solid-state image sensing device, e.g., a CCD or a CMOS (complementary metal oxide semiconductor) sensor comprising a plurality of pixels, is used; and the optical image formed by the imaging lens system TL is converted into an electronic signal. The optical image to be formed by the imaging lens system TL passes through the optical low-pass filter PL having a predetermined cutoff frequency characteristic that depends on the pixel pitch of the image sensing device SR, thereby adjusting the spatial frequency characteristic so that so-called aliasing noise, caused when the optical image is converted into an electronic signal, is minimized. The signal generated by the image sensing device (SR) undergoes predetermined digital image processing, image compression processing and the like as required, and is recorded in a memory, e.g., a semiconductor memory or an optical disk, as a digital video signal; in some cases, the signal is transferred to another apparatus either through a cable or by being converted into an infrared signal.

FIGS. 1, 3, 5, 7 and 9 are views showing the structures of the imaging lens systems TL of first to fifth embodiments, respectively, and show the lens arrangements thereof as cross-sectional views of the optical systems. In the figures, the surfaces marked with ri (i=1, 2, 3, . . . ) are the i-th surfaces counted from the object (subject) side (the surfaces ri marked with asterisks are aspherical surfaces), and di (i=1, 2, 3, . . . ) are the i-th axial distances counted from the object side.

Figure 1:
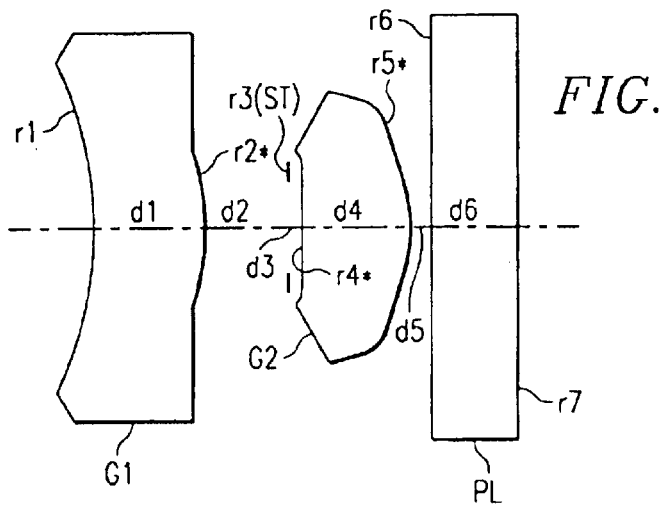
FIG. 1 is a cross-sectional view of an optical system of a first embodiment (Example 1) of the invention.
Figure 2A:
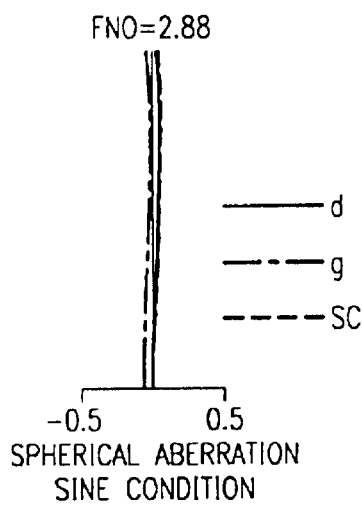
FIGS. 2A to 2C are graphic representations of aberrations of Example 1.
Figure 2B:
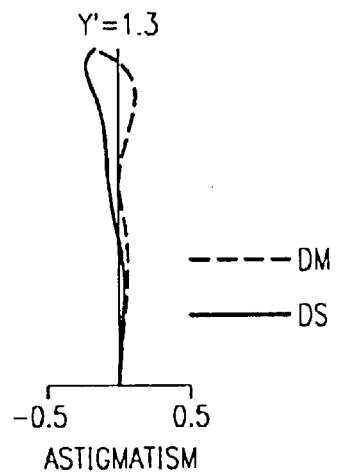
Figure 2C:
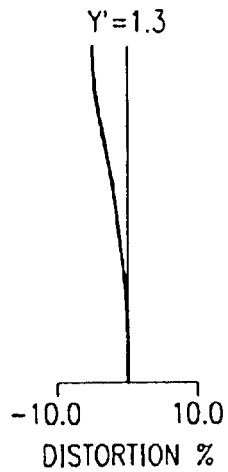
Figure 3:
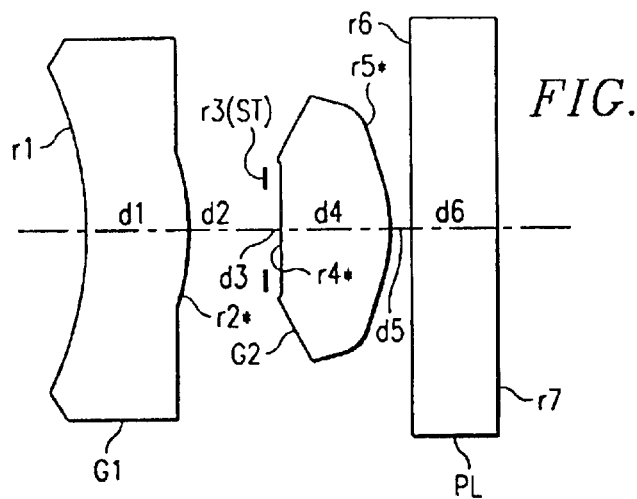
FIG. 3 is a cross-sectional view of an optical system of a second embodiment (Example 2) of the invention.
Figure 4A:
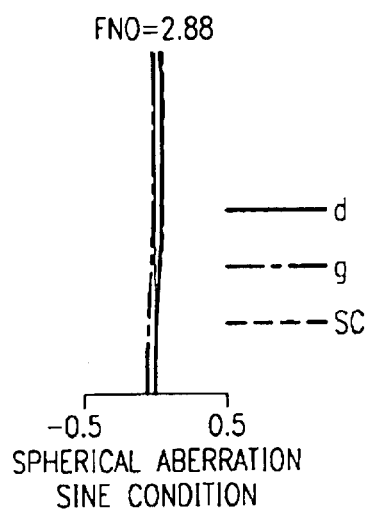
FIGS. 4A to 4C are graphic representations of aberrations of Example 2.
Figure 4B:
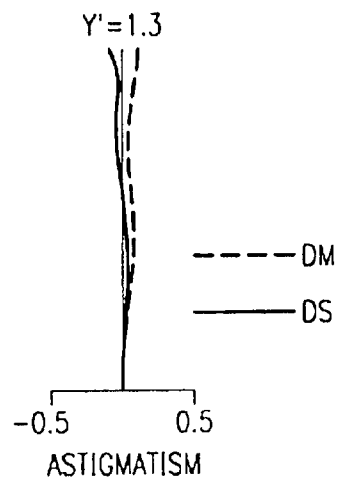
Figure 4C:
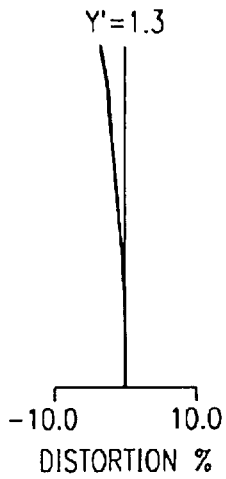
Figure 5:
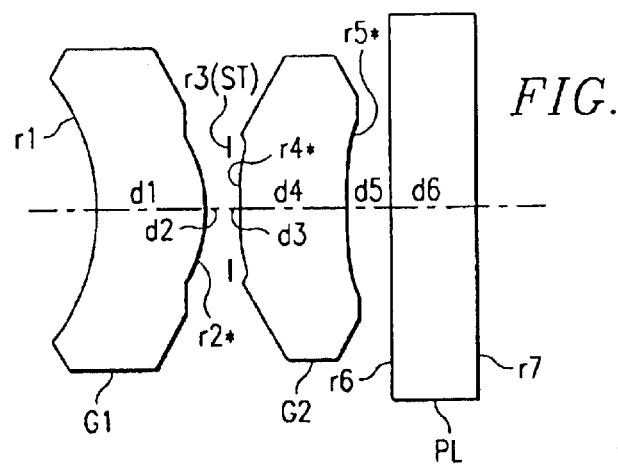
FIG. 5 is a cross-sectional view of an optical system of a third embodiment (Example 3) of the invention.
Figure 6A:
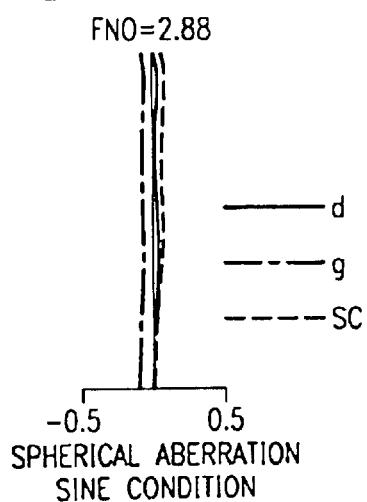
FIGS. 6A to 6C are graphic representations of aberrations of Example 3.
Figure 6B:
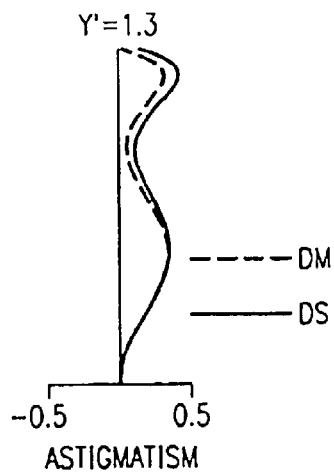
Figure 6C:
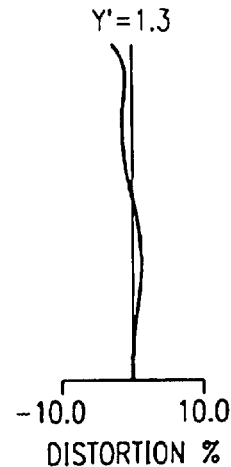
Figure 7:
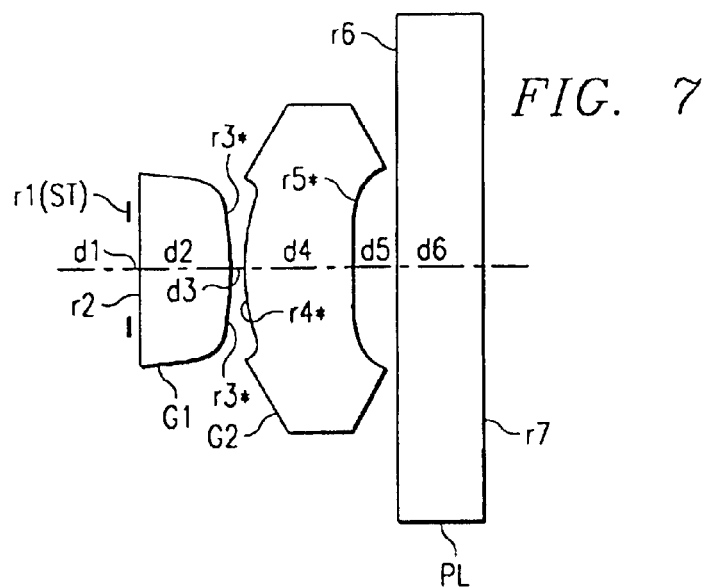
FIG. 7 is a cross-sectional view of an optical system of a fourth embodiment (Example 4) of the invention.
Figure 8A:
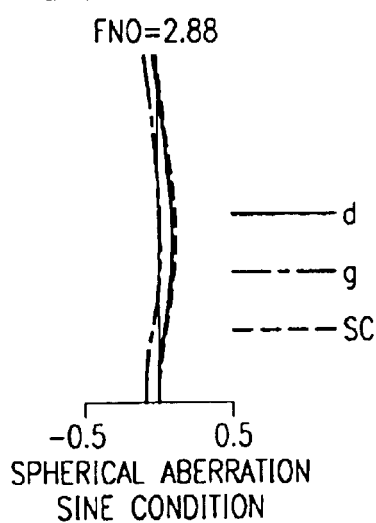
FIGS. 8A to 8C are graphic representations of aberrations of Example 4.
Figure 8B:
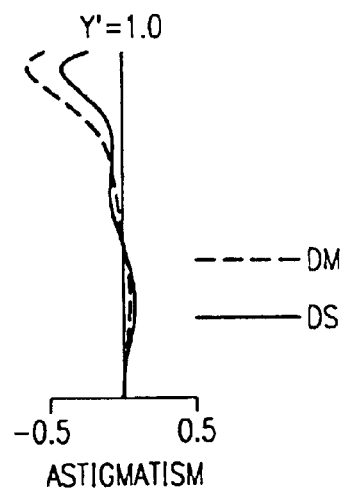
Figure 8C:
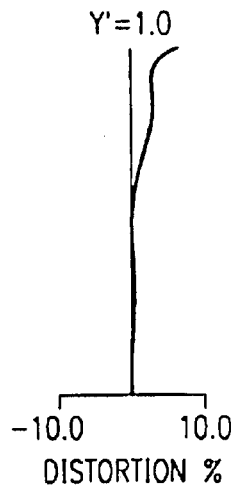
Figure 9:
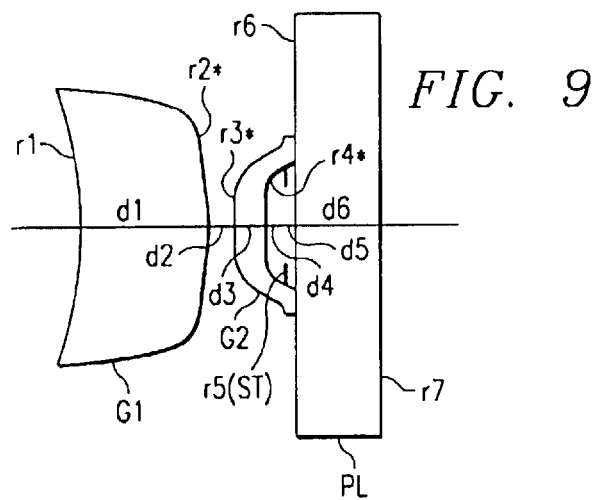
FIG. 9 is a cross-sectional view of an optical system of a fifth embodiment (Example 5) of the invention.
Figure 10A:
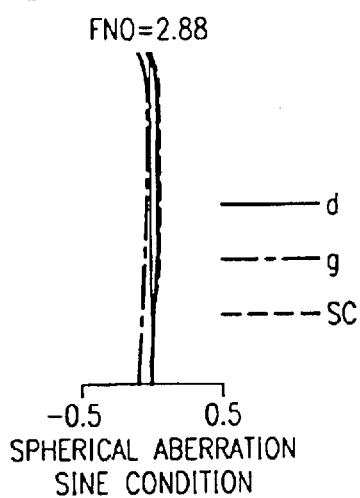
FIGS. 10A to 10C are graphic representations of aberrations of Example 5.
Figure 10B:
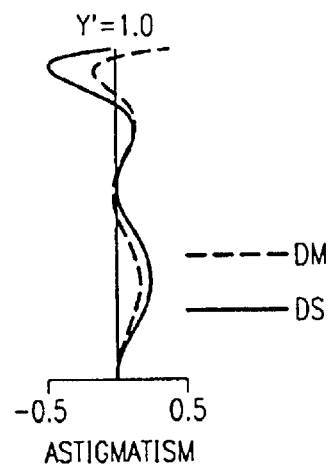
Figure 10C:
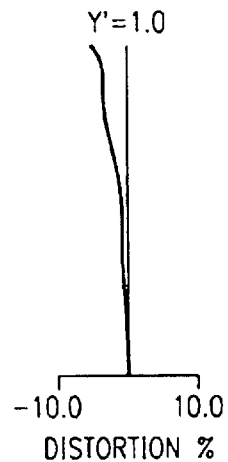

The embodiments each have a fixed-focal-length imaging lens system TL comprising two lens elements each made of a homogeneous material and having a positive optical power. The imaging lens system TL comprises from the object side: a first lens element G1, being a positive meniscus lens element convex to the image side; and a second lens element G2, being a bi-convex positive lens element. An aperture stop ST is disposed between the first lens element G1 and the second lens element G2 in the first to the third embodiments (FIGS. 1, 3, and 5), on the object side of the first lens element G1 in the fourth embodiment (FIG. 7), and on the image side of the second lens element G2 in the fifth embodiment (FIG. 9). As the imaging lens system TL compatible with the ⅐- to ¼-inch formats is used for imaging lens devices, e.g., digital cameras, and digital video unit, and the like which are provided with solid-state image sensing devices such as CCDs, a glass plane-parallel plate corresponding to an optical low-pass filter is disposed on the image side of the imaging lens system TL.

Since a sensor of a comparatively small format (that is, a solid-state image sensing device) is incorporated in an imaging lens device provided in mobile apparatuses such as portable telephones, it can be said that the two-element structure, being excellent in the balance between size and cost and easy to manufacture, is suitable for an imaging lens system TL for mobile apparatuses. To remove chromatic aberration, normally, a combination of a negative lens element and a positive lens element is most suitable. In small-format optical systems, however, since the removal of chromatic aberration itself is comparatively easy, chromatic aberration can be corrected to some extent without the use of a negative lens element. Therefore, to achieve both the smallest size possible and high optical performance, the embodiments employ the structure comprising two positive lens elements. It is desirable that the balance between the positive optical powers of the lens elements be such that the optical power of the first lens element G1 is weak and that of the second lens element G2 is strong, and in the embodiments, the optical power balance is realized by the lens configuration. That is, a positive meniscus lens element convex to the image side is used as the first lens element G1 to thereby effectively curb distortion, and a bi-convex positive lens element is used as the second lens element G2 to thereby reduce mainly error sensitivity.

In the imaging lens system TL comprising two positive lens elements made of a homogeneous material as in the embodiments, it is desirable to fulfill the condition (1) shown below. By fulfilling the condition (1), an excellent balance between high performance and compactness is achieved.

$$1.25 < L/f < 2.00 \tag{1}$$

where

L represents the distance from the most object side lens surface to the image plane; and f represents the overall focal length of the lens system.

When the value of L/f is lower than the lower limit of the condition (1), manufacture is difficult since the physical limit in manufacturing thin lens systems is exceeded. In addition, since it is necessary to increase the optical power of the second lens element G2, spherical aberration is undercorrected, and it is difficult to correct it. When the value of L/f is higher than the upper limit of the condition (1), compactness cannot be maintained, and balance with aberration correction cannot be achieved.

In the first embodiment (FIG. 1), the first lens element G1 is a plastic lens element made of polycarbonate (PC), and the second lens element G2 is a plastic lens element made of polymethyl methacrylate (PMMA). In the second embodiment (FIG. 3), the first and the second lens elements G1 and G2 are both glass lens elements. In the third to the fifth embodiments (FIGS. 5, 7 and 9), the first lens element G1 is a plastic lens made of PC, and the second lens element G2 is a glass lens element. To solve the problem of the temperature characteristic (that is, variation in back focal length due to variation in temperature), it is desirable to provide at least one glass lens element as in the second to the fifth embodiments. Particularly, it is most effective to use a glass lens element as the second lens element G2 having a strong optical power. Moreover, by the second lens element G2 being made of a low-dispersion material, chromatic aberration can effectively be corrected. Since variation in back focal length due to variation in temperature can be curbed by using a glass lens element, performance can be maintained even when the imaging lens system TL is used as a fixed-focal-length lens system.

In the imaging lens system TL comprising two positive lens elements as in the embodiments, it is desirable that at least one of the four lens surfaces be an aspherical surface. The use of an aspherical surface produces a great effect on the correction of spherical aberration, coma aberration and distortion. Particularly, by providing the first lens element G1 with an aspherical surface, distortion can effectively be corrected, and by providing the second lens element G2 with an aspherical surface, spherical aberration and coma aberration can effectively be corrected. When the temperature characteristic is considered, it is desirable that the lens element provided with an aspherical surface be a glass lens element. With at least one of the surfaces of the glass lens element being an aspherical surface, high optical performance that is not affected by variation in temperature can be obtained. For the first lens element G1, by only the image side surface thereof being an aspherical surface, balance between reduction in error sensitivity and correction of distortion can be achieved.

In the imaging lens system TL comprising two positive lens elements as in the embodiments, it is desirable to fulfill the condition (2) shown below. By fulfilling the condition (2), a compact imaging lens system TL with a short back focal length can be realized.

$$0.4 < B_f/f < 1.0 \quad (2)$$

where
  $B_f$ represents the back focal length; and
  f represents the overall focal length of the lens system.

When the value of $B_f/f$ is lower than the lower limit of the condition (2), the distance between the lens system and the sensor is too short, so that dust on the last lens surface and the like is noticeable and the diameter of the second lens element G2 increases. When the value of $B_f/f$ is higher than the upper limit of the condition (2), to secure the back focal length, the optical power of the first lens element G1 is too weak, so that over-side spherical aberration cannot be corrected.

In the imaging lens system TL comprising two positive lens elements G1 and G2 as in the embodiments, it is desirable to fulfill the conditions (3) and (4) shown below. By fulfilling the conditions (3) and (4), high optical performance can be achieved while compactness is maintained.

$$1 < f_1/f < 5 \quad (3)$$

$$1 < f_2/f < 20 \quad (4)$$

where
  $f_1$ represents the focal length of the first lens element G1;
  $f_2$ represents the focal length of the second lens element G2; and
  f represents the overall focal length of the lens system.

When the values of $f_1/f$ and $f_2/f$ are lower than the lower limits of the conditions (3) and (4), respectively, the optical powers of the lens elements are too strong, so that aberrations are adversely affected. That is, when the lower limit of the condition (3) is violated so that the positive optical power of the first lens element G1 is strong, the object side surface becomes closer to a convex surface, and correction of distortion is difficult. When the lower limit of the condition (4) is violated so that the positive optical power of the second lens element G2 is strong, correction of spherical aberration is difficult. When the values of $f_1/f$ and $f_2/f$ are higher than the upper limits of the conditions (3) and (4), respectively, the optical powers of the lens elements are too weak, so that although the conditions of aberrations are somewhat better, the overall length is large and compactness cannot be maintained. That is, when the upper limit of the condition (3) is exceeded so that the optical power of the first lens element G1 is weak, it is necessary to increase the positive optical power of the second lens element G2, and correction of spherical aberration is difficult. When the upper limit of the condition (4) is exceeded so that the positive optical power of the second lens element G2 is weak, it is necessary to increase the optical power of the first lens element G1, and correction of distortion is difficult.

While the imaging lens systems TL of the embodiments comprise only refractive lens elements that deflect the incident ray by refraction (that is, lens elements of a type in which the incident ray is deflected at an interface between media having different refractive indices), the present invention is not limited thereto. For example, a diffracting surface may be provided on a lens element of a homogeneous material so that the incident ray is deflected by diffraction or that the incident ray is deflected by a combination of diffraction and refraction. Moreover, a refracting surface may be provided on a gradient index lens element that deflects the incident ray by the distribution of refractive index in the medium. In that case, the gradient index lens element may have a positive meniscus configuration convex to the image side or a bi-convex configuration.

In the embodiments, the optical path may be bent in front of, in the rear of or in the midst of the imaging lens system TL by disposing a surface having no optical power (for example, a reflecting surface, a refracting surface or a diffracting surface) on the optical path. The position of bend is set as required. By appropriately bending the optical path, reduction in the thickness of the appearance of the camera can be achieved. For example, by bending the optical path at 90 degrees by disposing a mirror at the rear of the first lens element G1, a structure is obtained in which the thickness of the camera does not change due to collapse of the lens barrel or the like.

With respect to the embodiments, a configuration example of the optical low-pass filter is shown that has the configuration of the plane-parallel plate PL disposed between the last surface of the imaging lens system TL and the image sensing device SR. As the low-pass filter, low-pass filters such as the following ones may be employed: a birefringence-type low-pass filter made of quartz having a predetermined crystallographic axis direction adjusted or the like; and a phase-type low-pass filter that achieves the required optical cutoff frequency characteristic by a diffraction effect.

PRACTICAL EXAMPLES

The arrangement of the imaging lens system TL used for the imaging lens device embodying the present invention will more concretely be described with reference to construction data, graphic representations of aberrations and the like. Examples 1 to 5 shown here correspond to the above-described first to fifth embodiments, and the lens arrangement views showing the first to the fifth embodiments (FIGS. 1, 3, 5, 7 and 9) show the lens arrangements of Examples 1 to 5, respectively. Tables 1 to 5 list the construction data of Examples 1 to 5, respectively. In the construction data of the examples, ri (i=1, 2, 3, . . . ) represents the radius of curvature (mm) of the i-th surface counted from the object side, di (i=1, 2, 3, . . . ) represents the i-th axial distance (mm) counted from the object side, and Ni (i=1, 2, 3, . . . ) and vi (i=1, 2, 3, . . . ) represent the refractive index Nd for the d-line and the Abbe number vd of the i-th optical element counted from the object side, respectively. The overall focal length f (mm) of the lens system and the F-number FNO are shown together with the other data. The corresponding values of the conditions are shown in Table 6.

The surfaces with radii of curvature ri marked with asterisks are aspherical surfaces, which are assumed to be defined by the expression (AS) representing an aspherical surface configuration. The aspherical data of the examples are shown together with the other data.

$$X(H) = (C0 \cdot H^2) \bigg/ \left\{ 1 + \sqrt{1 - \varepsilon \cdot C0^2 \cdot H^2} \right\} + (A4 \cdot H^4 + A6 \cdot H^6 + A8 \cdot H^8 + A10 \cdot H^{10}) \quad (AS)$$

where
  X(H) represents the displacement along the optical axis at the height H (relative to the vertex);
  H represents the height in a direction perpendicular to the optical axis;
  C0 represents the paraxial curvature (=the reciprocal of the radius of curvature);

$\epsilon$ represents the quadric surface parameter; and

Ai represents the aspherical surface coefficient of i-th order.

FIGS. 2A to 2C, 4A to 4C, 6A to 6C, 8A to 8C and 10A to 10C are graphic representations of aberrations of the first to the fifth examples, respectively. FIGS. 2A, 4A, 6A, 8A and 10A show spherical aberration and sine condition. FIGS. 2B, 4B, 6B, 8B and 10B show astigmatism. FIGS. 2C, 4C, 6C, 8C and 10C show distortion. Y' represents the maximum image height (mm). In the graphic representations of spherical aberration and sine condition, the solid line d represents the spherical aberration for the d-line, the alternate long and short dash line g represents the spherical aberration for the g-line, and the broken line SC represents the sine condition. In the graphic representations of astigmatism, the broken line DM represents the astigmatism to the d-line on the meridional image plane, and the solid line DS represents the astigmatism to the d-line on the sagittal image plane. In the graphic representations of distortion, the solid line represents the distortion % to the d-line.

As described above, according to the present invention, an imaging lens device is realized that has an imaging lens system being low in cost and excellent in the balance between high performance and compactness. Application of the present invention to a digital camera, a video camera, or a camera incorporated in or externally attached to an apparatus such as a digital video unit, a personal computer, a mobile computer, a portable telephone or a PDA contributes to reduced size and improved performance of these apparatuses.

Obviously, many modifications and variations of the present invention are possible in light of the above teachings. It is therefore to be understood that within the scope of the appended claims, the invention may be practiced other than as specifically described.

TABLE 1

Construction Data of Example 1

$f = 2.3$, FNO = 2.88

| Radius of Curvature | Axial Distance | Refractive Index | Abbe Number |
|---|---|---|---|
| r1 = −3.577 | | | |
| | d1 = 1.000 | N1 = 1.58340 | ν1 = 30.23 |
| r2* = −1.953 | | | |
| | d2 = 0.802 | | |
| r3 = ∞(ST) | | | |
| | d3 = 0.124 | | |
| r4* = 49.183 | | | |
| | d4 = 1.001 | N2 = 1.49140 | ν2 = 57.82 |
| r5* = −1.624 | | | |
| | d5 = 0.206 | | |
| r6 = ∞ | | | |
| | d6 = 0.800 | N3 = 1.51680 | ν3 = 64.20 |
| r7 = ∞ | | | |

Aspherical Surface Data of Surface r2
$\epsilon = 0.50191 \times 10$
A4 = 0.12260
A6 = 0.16616
A8 = −0.36232
A10 = 0.48834
Aspherical Surface Data of Surface r4
$\epsilon = -0.20253 \times 10^{32}$
A4 = 0.16659
A6 = −0.12700 × 10
A8 = 0.71953 × 10
A10 = −0.12796 × 10²
Aspherical Surface Data of Surface r5
$\epsilon = -0.39111 \times 10$
A4 = −0.22658 × 10⁻¹
A6 = −0.11871

TABLE 1-continued

Construction Data of Example 1

$f = 2.3$, FNO = 2.88

| Radius of Curvature | Axial Distance | Refractive Index | Abbe Number |
|---|---|---|---|

A8 = 0.38863
A10 = −0.24639

TABLE 2

Construction Data of Example 2

$f = 2.3$, FNO = 2.88

| Radius of Curvature | Axial Distance | Refractive Index | Abbe Number |
|---|---|---|---|
| r1 = −3.597 | | | |
| | d1 = 0.971 | N1 = 1.57723 | ν1 = 30.23 |
| r2* = −1.959 | | | |
| | d2 = 0.745 | | |
| r3 = ∞(ST) | | | |
| | d3 = 0.153 | | |
| r4* = 43.189 | | | |
| | d4 = 1.039 | N2 = 1.52277 | ν2 = 58.57 |
| r5* = −1.625 | | | |
| | d5 = 0.203 | | |
| r6 = ∞ | | | |
| | d6 = 0.800 | N3 = 1.51696 | ν3 = 64.20 |
| r7 = ∞ | | | |

Aspherical Surface Data of Surface r2
$\epsilon = 0.50191 \times 10$
A4 = 0.12132
A6 = 0.16246
A8 = −0.35297
A10 = 0.46937
Aspherical Surface Data of Surface r4
$\epsilon = -0.20253 \times 10^{32}$
A4 = 0.16308
A6 = −0.12561 × 10
A8 = 0.70783 × 10
A10 = −0.12534 × 10²
Aspherical Surface Data of Surface r5
$\epsilon = -0.39111 \times 10$
A4 = −0.20639 × 10⁻¹
A6 = −0.11678
A8 = 0.38539
A10 = −0.24121

TABLE 3

Construction Data of Example 3

$f = 2.3$, FNO = 2.88

| Radius of Curvature | Axial Distance | Refractive Index | Abbe Number |
|---|---|---|---|
| r1 = −1.874 | | | |
| | d1 = 1.000 | N1 = 1.58340 | ν1 = 30.23 |
| r2* = −1.022 | | | |
| | d2 = 0.225 | | |
| r3 = ∞(ST) | | | |
| | d3 = 0.100 | | |
| r4* = 13.101 | | | |
| | d4 = 1.000 | N2 = 1.52307 | ν2 = 58.57 |
| r5* = −32.837 | | | |
| | d5 = 0.418 | | |
| r6 = ∞ | | | |
| | d6 = 0.800 | N3 = 1.51680 | ν3 = 64.20 |
| r7 = ∞ | | | |

Aspherical Surface Data of Surface r2
$\epsilon = 0.53344$
A4 = 0.29872
A6 = 0.39995

TABLE 3-continued

Construction Data of Example 3 f = 2.3, FNO = 2.88

| Radius of Curvature | Axial Distance | Refractive Index | Abbe Number |
|---|---|---|---|

A8 = −0.20706 × 10
A10 = 0.26698 × 10
Aspherical Surface Data of Surface r4
$\epsilon$ = −0.20253 × 10$^{32}$
A4 = 0.12524 × 10
A6 = −0.61979 × 10
A8 = 0.22858 × 10
A10 = −0.33435 × 10$^2$
Aspherical Surface Data of Surface r5
$\epsilon$ = −0.43927 × 10$^{21}$
A4 = 0.24322
A6 = 0.43841 × 10$^{-1}$
A8 = 0.18176 × 10$^{-1}$
A10 = −0.15966

TABLE 4

Construction Data of Example 4 f = 2.3, FNO = 2.88

| Radius of Curvature | Axial Distance | Refractive Index | Abbe Number |
|---|---|---|---|
| r1 = ∞(ST) | | | |
| | d1 = 0.100 | | |
| r2 = −42.511 | | | |
| | d2 = 0.800 | N1 = 1.58340 | ν1 = 30.23 |
| r3* = −1.404 | | | |
| | d3 = 0.100 | | |
| r4* = 26.502 | | | |
| | d4 = 1.000 | N2 = 1.52307 | ν2 = 58.57 |
| r5* = −100.854 | | | |
| | d5 = 0.418 | | |
| r6 = ∞ | | | |
| | d6 = 0.800 | N3 = 1.51680 | ν3 = 64.20 |
| r7 = ∞ | | | |

Aspherical Surface Data of Surface r3
$\epsilon$ = 0.88001 × 10$^{-1}$
A4 = 0.15605 × 10
A6 = −0.59160 × 10
A8 = 0.12079 × 10$^2$
A10 = −0.11375 × 10$^2$
Aspherical Surface Data of Surface r4
$\epsilon$ = −0.20253 × 10$^{32}$
A4 = 0.19895 × 10
A6 = −0.71139 × 10
A8 = 0.15026 × 10$^2$
A10 = −0.13679 × 10$^2$
Aspherical Surface Data of Surface r5
$\epsilon$ = −0.43927 × 10$^{21}$
A4 = 0.12601
A6 = 0.11719 ×10
A8 = −0.27620 × 10
A10 = 0.22519 × 10

TABLE 5

Construction Data of Example 5 f = 2.3, FNO = 2.88

| Radius of Curvature | Axial Distance | Refractive Index | Abbe Number |
|---|---|---|---|
| r1 = −3.680 | | | |
| | d1 = 1.226 | N1 = 1.58340 | ν1 = 30.23 |
| r2* = −1.219 | | | |
| | d2 = 0.240 | | |

TABLE 5-continued

Construction Data of Example 5 f = 2.3, FNO = 2.88

| Radius of Curvature | Axial Distance | Refractive Index | Abbe Number |
|---|---|---|---|
| r3* = 106.467 | | | |
| | d3 = 0.311 | N2 = 1.52307 | ν2 = 58.57 |
| r4* = −11.875 | | | |
| | d4 = 0.200 | | |
| r5 = ∞(ST) | | | |
| | d5 = 0.100 | | |
| r6 = ∞ | | | |
| | d6 = 0.800 | N3 = 1.51680 | ν3 = 64.20 |
| r7 = ∞ | | | |

Aspherical Surface Data of Surface r2
$\epsilon$ = −0.56853
A4 = 0.70404
A6 = −0.93824
A8 = 0.74920
A10 = −0.32967
Aspherical Surface Data of Surface r3
$\epsilon$ = −0.20253 × 10$^{32}$
A4 = 0.23546 × 10
A6 = −0.67184 × 10
A8 = 0.20433 × 10$^2$
A10 = −0.19919 × 10$^2$
Aspherical Surface Data of Surface r4
$\epsilon$ = −0.43927 × 10$^{21}$
A4 = 0.81045
A6 = 0.41248 × 10
A8 = −0.28180 × 10$^2$
A10 = 0.83982 × 10$^2$

TABLE 6

Actual Values of Conditional Formulae

| | (1) L/f | (2) B$_f$/f | (3) f$_1$/f | (4) f$_2$/f |
|---|---|---|---|---|
| Example 1 | 2.23 | 0.85 | 2.61 | 1.40 |
| Example 2 | 2.22 | 0.83 | 2.66 | 1.31 |
| Example 3 | 1.96 | 0.81 | 1.17 | 7.84 |
| Example 4 | 1.69 | 0.70 | 1.07 | 17.49 |
| Example 5 | 1.86 | 0.97 | 1.42 | 8.89 |

What is claimed is:

1. An imaging lens device comprising:

an imaging lens system that forms an optical image; and an image sensing device that converts the optical image formed by said imaging lens system into an electronic signal;

wherein said imaging lens system consists of two lens elements and an aperture stop, each of said lens elements being made of a homogeneous material and having a positive optical power, and wherein said imaging lens system fulfills the following condition:

1.25 < L/f < 2.00 where

L represents a distance from a most object side lens surface to an image plane, said image plane coinciding with the image sensing device; and f represents an overall focal length of the lens system.

2. An imaging lens device according to claim 1, wherein at least one of said two lens elements is a glass lens element, and at least one surface of said glass lens element is an aspherical surface.

3. An imaging lens device according to claim 1, wherein each of the two lens elements has at least two surfaces, and wherein at least one surface of either of said two lens elements is an aspherical surface.

4. An imaging lens device according to claim 1, wherein said imaging lens system further fulfills the following condition:

$$0.4 < B_f/f < 1.0$$

where $B_f$ represents a back focal length; and f represents the overall focal length of the lens system.

5. An imaging lens device according to claim 1, wherein the two lens elements of said imaging lens system comprise, from the object side thereof, a first lens element and a second lens element, and wherein said imaging lens system fulfills the following conditions:

$$1 < f_1/f < 5$$

and $$1 < f_2/f < 20$$

where $f_1$ represents a focal length of said first lens element;

$f_2$ represents a focal length of said second lens element; and f represents the overall focal length of the lens system.

6. An imaging lens device comprising:

an imaging lens system that forms an optical image; and a two-dimensional image sensing device that converts the optical image formed by said imaging lens system into an electronic signal, said image sensing device being disposed on an image side of said imaging lens system;

wherein said imaging lens system consists of, from an object side thereof: a first lens element, being a positive meniscus lens element convex to an image side; an aperture stop; and a second lens element, being a bi-convex positive lens element.

7. An imaging lens device according to claim 6, wherein at least one of said first lens element and said second lens element is a glass lens element, and wherein at least one surface of said glass lens element is an aspherical surface.

8. An imaging lens device according to claim 6, wherein each of the first lens element and the second lens element has at least two surfaces, and wherein at least one surface of either of said first lens element and said second lens element is an aspherical surface.

9. An imaging lens device according to claim 6, wherein said imaging lens system further fulfills the following condition:

$$0.4 < B_f/f < 1.0$$

where $B_f$ represents a back focal length; and f represents the overall focal length of the lens system.

10. An imaging lens device according to claim 6, wherein said imaging lens system comprises from the object side a first lens element and a second lens element, and fulfills the following conditions:

$$1 < f_1/f < 5$$

and $$1 < f_2/f < 20$$

where $f_1$ represents a focal length of said first lens element;

$f_2$ represents a focal length of said second lens element; and f represents the overall focal length of the lens system.

11. A telephonic device comprising:

an imaging lens system that forms an optical image; and an image sensing device that converts the optical image formed by said imaging lens system into an electronic signal;

wherein said imaging lens system consists of two lens elements and an aperture stop, each of said lens elements being made of a homogeneous material and having a positive optical power, and wherein said imaging lens system fulfills the following condition:

$$1.25 < L/f < 2.00$$

where

L represents a distance from a most object side lens surface to an image plane, and said image plane coinciding with the image sensing device; and f represents an overall focal length of the lens system.

12. A telephonic device according to claim 11, wherein the telephonic device is portable.

13. An imaging lens device comprising:

an imaging lens system that forms an optical image; and an image sensing device that converts the optical image formed by said imaging lens system into an electronic signal;

wherein said imaging lens system comprises two lens elements, each made of a homogeneous material and having a positive optical power, and wherein said imaging lens system fulfills the following condition:

$$1.25 < L/f < 2.00$$

where

L represents a distance from a most object side lens surface to an image plane, said image plane coinciding with the image sensing device; and f represents an overall focal length of the lens system, and wherein said imaging lens system further fulfills the following condition:

$$0.4 < B_f/f < 1.0$$

where $B_f$ represents a back focal length; and f represents the overall focal length of the lens system.

14. An imaging lens device comprising:

an imaging lens system that forms an optical image; and an image sensing device that converts the optical image formed by said imaging lens system into an electronic signal;

wherein said imaging lens system comprises two lens elements, each made of a homogeneous material and having a positive optical power, and wherein said imaging lens system fulfills the following condition:

$$1.25 < L/f < 2.00$$

where

L represents a distance from a most object side lens surface to an image plane, said image plane coinciding with the image sensing device; and f represents an overall focal length of the lens system, and wherein the two lens elements of said imaging lens system comprise, from the object side thereof, a first lens element and a second lens element, and wherein said imaging lens system fulfills the following conditions:

$$1 < f_1/f < 5$$

and $$1 < f_2/f < 20$$

where $f_1$ represents a focal length of said first lens element;

$f_2$ represents a focal length of said second lens element; and f represents the overall focal length of the lens system.

15. An imaging lens device comprising:

an imaging lens system that forms an optical image; and an image sensing device that converts the optical image formed by said imaging lens system into an electronic signal;

wherein said imaging lens system comprises, from an object side thereof: a first lens element, being a positive meniscus lens element convex to an image side; and a second lens element, being a bi-convex positive lens element, and wherein said imaging lens system further fulfills the following condition:

$$0.4 < B_f/f < 1.0$$

where $B_f$ represents a back focal length; and f represents the overall focal length of the lens system.

16. An imaging lens device comprising:

an imaging lens system that forms an optical image; and an image sensing device that converts the optical image formed by said imaging lens system into an electronic signal;

wherein said imaging lens system comprises, from an object side thereof: a first lens element, being a positive meniscus lens element convex to an image side; and a second lens element, being a hi-convex positive lens element, and wherein said imaging lens system fulfills the following conditions:

$$1 < f_1/f < 5$$

and $$1 < f_2/f < 20$$

where $f_1$ represents a focal length of said first lens element;

$f_2$ represents a focal length of said second lens element; and f represents the overall focal length of the lens system.

* * * * *